(12) United States Patent
Goldstein

(10) Patent No.: US 7,897,708 B2
(45) Date of Patent: Mar. 1, 2011

(54) SELF-CROSSLINKING DISPERSIONS UTILIZING ACRYLAMIDE/N-ALKYLOLACRYLAMIDE CROSSLINKING MIXTURE WITH C2-C10 ALKYLOL

(75) Inventor: Joel E. Goldstein, East Brunswick, NJ (US)

(73) Assignee: Celanese International Corp., Dallas, TX (US)

( * ) Notice: Subject to any disclaimer, the term of this patent is extended or adjusted under 35 U.S.C. 154(b) by 251 days.

(21) Appl. No.: 11/888,164

(22) Filed: Jul. 31, 2007

(65) Prior Publication Data

US 2009/0036574 A1    Feb. 5, 2009

(51) Int. Cl.
  *C08F 218/08*  (2006.01)
  *D04H 1/64*   (2006.01)
(52) U.S. Cl. ............... 526/307.2; 526/304; 526/307.5
(58) Field of Classification Search ............ 526/307.2, 526/304, 307.5
See application file for complete search history.

(56) References Cited

U.S. PATENT DOCUMENTS

| 3,714,099 A | 1/1973 | Biale .................. 260/29.67 TA |
| 3,714,100 A | 1/1973 | Biale et al. ............ 260/29.6 TA |
| 4,449,978 A | 5/1984 | Iacoviello ................. 604/372 |
| 5,021,529 A * | 6/1991 | Garrett ...................... 526/304 |

* cited by examiner

*Primary Examiner*—Kelechi C Egwim
(74) *Attorney, Agent, or Firm*—Michael W. Ferrell

(57) ABSTRACT

An aqueous dispersion includes a self-crosslinking alkylolacrylamide containing interpolymer, the interpolymer being prepared in an emulsion polymerization medium by way of interpolymerizing in the medium: (a) acrylamide monomer; (b) $N-C_2$ to $C_{10}$ alkylolacrylamide monomer, wherein the molar ratio of acrylamide:$N-C_2$ to $C_{10}$ alkylolacrylamide interpolymerized is at least 0.5; and (c) at least one or more additional ethylenically unsaturated monomers added to the medium in an amount of from about 80 weight % to about 98 weight % based on the dry weight of monomer interpolymerized in the medium. The dispersions are particularly useful as binders for fibrous webs.

19 Claims, No Drawings

SELF-CROSSLINKING DISPERSIONS UTILIZING ACRYLAMIDE/N-ALKYLOLACRYLAMIDE CROSSLINKING MIXTURE WITH C2-C10 ALKYLOL

TECHNICAL FIELD

The present invention relates to dispersions of self-crosslinking polymer dispersions generally and in preferred embodiments to aqueous dispersions of vinyl acetate containing polymers which incorporate mixtures of acrylamide/N-ethylolacrylamide as the crosslinker.

BACKGROUND

Polymeric dispersions are applied to nonwovens to hold together the fibers of a web, such that the web exhibits elevated tensile strength or is self-sustaining. Suitable conventional dispersions include self-crosslinking polymers of vinyl acetate and ethylene with N-methylolacrylamide (NMA) incorporated into the polymer as a crosslinker. The NMA crosslinker provides enhanced wet strength and resistance to organic solvents; however these compositions tend to evolve formaldehyde which is perceived as a health hazard. Accordingly, numerous attempts have been made to reduce or eliminate formaldehyde in self-crosslinking products.

U.S. Pat. No. 4,449,978 to Iacoviello discloses the usage of N-methylolacrylamide in conjunction with acrylamide (for example, in a 1:1 molar ratio) as the crosslinking chemicals. This approach does not provide formaldehyde free systems, but it does provide systems with significantly lower levels of free formaldehyde compared to systems using only N-methylol-acrylamide as the crosslinking chemical. It is seen in this patent that the same amount by weight of the mixture provides properties comparable to N-methylolacrylamide only, even though only half of the moles of the mixture contain the methylol self-crosslinking moiety. See Table 4, Col. 13-14.

U.S. Pat. Nos. 3,714,099 and 3,714,100 to Biale and Biale et al. respectively disclose using N-ethylolacrylamide as the crosslinking monomer in either vinyl acetate or vinyl acetate/ethylene polymers. U.S. Pat. No. 5,021,529 to Garrett also discloses using N-ethylolacrylamide as an ingredient, or using acrylamide and then adding acetaldehyde to the finished dispersion polymer thereby making N-ethylolacrylamide in-situ.

While N-ethylolacrylamides have been disclosed in the literature to be useful as crosslinkers, they are not used commercially because, in part, they do not provide wet strength properties comparable to NMA containing compositions. See U.S. Pat. No. 5,021,529 to Garrett noted above at Col. 9-Col. 10, Tables 1 and 2 as to wet strength of ethyl acrylate binders, where it is seen that the NMA based self-crosslinking resin systems exhibit much more wet tensile. Thus, N-ethylolacrylamide and higher alkylolacrylamides are generally perceived as unsuitable as a crosslinker for commercial use.

Without intending to be bound by any particular theory, it is noted that the equilibrium of the reaction of acrylamide and acetaldehyde lies less towards the product, N-ethylolacrylamide, than the corresponding reaction of formaldehyde with acrylamide lies towards its product, N-methylolacrylamide. Therefore, there is inherently a relatively high level of acetaldehyde present in N-ethylolacrylamide compositions. Acetaldehyde (unlike formaldehyde) is a chain transfer agent which results in the formation of low molecular weight polymers or oligomers rather than the higher molecular weight polymers needed for Engineered Fabric and textile applications. In these applications, the goal is to achieve infinite molecular weight networks to provide the finished fabric with wet strength and solvent resistance comparable to woven fabrics. Since acetaldehyde in the polymerization mixture acts as a chain transfer agent, transferring the radical from the chain to a monomer, the resulting product fails to achieve sufficient molecular weight to provide the desired strength properties. Adding more N-ethylolacrylamide will provide a higher level of crosslinking, but also increases the amount of acetaldehyde which has a deleterious effect on molecular weight.

One proposed method for removing aldehydes from N-alkylolacrylamide mixtures involves reducing the aldehyde to ethanol with sodium borohydride. See U.S. Pat. No. 5,415,926 to Leighton et al. While this may be a feasible method of rendering an aldehyde containing mixture useable, the method is expensive and time consuming, at best. It may also not be effective because the reaction product, N-alkylolacrylamide, may simply undergo retro-reaction to restore an equilibrium composition when used in a binder composition.

SUMMARY OF THE INVENTION

It has been found that adding a mixture of acrylamide and N-alkylolacrylamide ($C_2$ and higher alkylol) to a binder composition during polymerization provides a self-crosslinking dispersion while ameliorating the adverse effects of free aldehyde on the binder polymer so made. Without intending to be bound by theory, it is believed that the acrylamide present forces equilibrium towards the N-alkylolacrylamide product, reducing the level of residual alkylaldehyde in the system. This allows higher molecular weight polymers to be made compared to those systems which only use N-ethylolacrylamide, for example. The acrylamide/alkylolacrylamide mixtures are suitably prepared by using excess acrylamide when preparing alkylolacrylamide.

These new systems provide formaldehyde-free latex polymers which may be used instead of formaldehyde-containing analogs. In this regard, the same amount by weight of 1:1 N-ethylolacrylamide/acrylamide was used instead of 1:1 N-methylolacrylamide/acrylamide in a control polymer. Due to the difference in molecular weight, there was only roughly 87% of the moles of N-ethylolacrylamide present as the equivalent mass of N-methylolacrylamide in the control polymer, yet the properties were comparable. The molecular weight may be incrementally increased by adding an in-situ crosslinker such as diallyl phthalate or tri-allylcyanurate, if so desired. It is also possible to further reduce the excess acetaldehyde to ethanol with the sodium borohydride approach mentioned above or to increase the amount of acrylamide so that the ratio is richer in acrylamide in order to further influence equilibrium between acrylamide and alkylolacrylamide in the system. Alternatively, one could use relatively less acrylamide and still positively influence the crosslinking system as compared with using an alkylolacrylamide alone.

Further details and advantages will become apparent from the discussion which follows.

DETAILED DESCRIPTION

The invention is described in detail below for purposes of illustration only. Modifications within the spirit and scope of the present invention, set forth in the appended claims, will be readily apparent to one of skill in the art. Terminology used herein has its ordinary meaning, unless a more specific definition is expressly provided.

As used in the specification and claims, the term "acrylamide" and "alkylolacrylamide" refers to acrylamide or its functional equivalent, methacrylamide when these terms are in lower case. An initial capitalization, i.e., "Acrylamide" or "alkylolAcrylamide" denotes acrylamide per se.

$C_2$, $C_3$, $C_4$ and so forth refer respectively to two carbon, three carbon and four carbon containing moieties and so on. Thus, an N—$C_2$ to $C_{10}$ alkylolacrylamide refers to N-ethylolacrylamide, N-propylolacrylamide and so forth up to $C_{10}$ N-alkylolacrylamides.

"Time delay" and like terminology refers to the total time period an ingredient or mixture of ingredients is added to a reaction medium.

The aqueous dispersions described herein may be prepared using materials and techniques known in the art. Monomer compositions, emulsifiers, testing procedures and so forth appear in U.S. Pat. No. 7,056,847 to Walker et al., the disclosure of which is incorporated herein by reference, as well as the aforementioned U.S. Pat. No. 5,021,529 to Garrett, the disclosure of which is also incorporated by reference.

The compositions of the invention are useful generally as binder resin compositions and are particularly useful in the production of nonwoven products made from a web of fibers. The web may be formed by any process known in the art, such as a carded, air-laid, dry-laid, wet-laid, or air-formed process. The fibers can be natural, synthetic, or a mixture thereof. The binder is applied to the fiber by any means known in the art, such as print, foam, saturate, coating, and spraying; then dried on steam cans or ovens as currently practiced in the production of non-woven rolled goods. Binder add-on levels for nonwovens useful in the present invention can be from 0.1 to 100 percent, preferably from 3 to 30 percent. Nonwovens made with the binder of the present invention are useful in applications in which wet integrity or resiliency is important, such as wipes, diapers, feminine hygiene, medical, and filtration products. Non-woven wipes may be used in the dry form and wetted just prior to use, or may be pre-moistened with either aqueous or organic solvents as known in the art. Wipes are useful in applications that include household cleaning, personal cleansing, baby wipes, and industrial wipes. Nonwovens of the invention includes both disposable non-woven products, as well as durable nonwovens such as abrasive pads, medical fabrics, and apparel lining.

The emulsion binder of the invention may also be used as a binder for double re-creped paper. Double recreped paper is used in products such as toweling. The binder is print applied at an add-on level of about 4 to 20 percent.

The emulsion binder may be used to bind other fibers, such as fiberglass, and carbon fibers, by means known in the art.

EXAMPLE 1

The following procedure was used to prepare an aqueous vinyl acetate dispersion of the invention.

480.0 g of deionized water, 3.0 g of Aerosol A-102, 15.00 g of a 25% aqueous solution of sodium vinyl sulfonate (SVS), 0.12 g sodium acetate, 3.60 g of Igepal CA-887, 0.6 g of sodium formaldehyde sulfoxylate (SFS), 2.40 g of a 1% aqueous solution of Versene 100 and 2.40 g of a 1% aqueous solution of ferrous sulfate was added to a one liter glass reactor. Enough phosphoric acid was provided to adjust the pH to between 3.8 and 4.2. While stirring, the vessel was purged with a nitrogen flow. After 10 minutes, the reactor was heated to 65° C. for initiation; however, when the temperature in the reactor reached 50° C., 60.0 g of vinyl acetate was added to the reactor followed by other ingredients as specified. When the temperature in the reactor was 58° C. (and thereafter), an aqueous solution of 2.64 g t-butyl hydroperoxide in 60.0 g of deionized water was slowly added to the reactor so that the total delay time was 4.25 hours. At the same time (and thereafter) an aqueous solution of 1.72 g of SFS in 54.0 g of deionized water was slowly added to the reactor so that its total delay time was equivalent to that of the aqueous solution of t-butyl hydroperoxide. When the temperature in the reactor reached 65° C., initiation was observed. Five minutes after the observed initiation, an aqueous solution of 72.0 g of deionized water, 24.0 g of Aerosol A-102, 8.40 g of Igepal CA-887, 0.60 g of sodium acetate, 510 g of vinyl acetate, 30.0 g of butyl acrylate and 75.0 g of a 48% aqueous solution of acrylamide and N-ethylolacrylamide in a 1:1 molar ratio (NEA) (low acetaldehyde) was added and continued to be added such that its total delay time was four hours. The temperature in the reactor was maintained by adjusting the feed rate of the redox couple. When the monomer was completely added to the reactor the redox couple continued to be added for another five minutes. At this point, 0.15 g of t-butyl hydroperoxide was added and the reaction was stirred for five minutes. Then an aqueous solution of 0.72 g of SFS in 6.0 g of deionized water was added and the reaction is stirred for another fifteen minutes. The reaction was then allowed to cool. When the reactor has cooled to 30° C., the dispersion was transferred to a clean quart bottle. The resulting dispersion was 46.29% solids with a pH of 5.0, a Brookfield viscosity of 44 cps, 0.017% grit and a particle size of 343 nm.

EXAMPLE 2

The following procedure was used to prepare an aqueous ethylene/vinyl acetate dispersion of the invention.

1610.0 g of deionized water, 14.0 g of a 1% aqueous solution of ferrous sulfate, 84.0 g of SVS, 87.5 g Hostapur SAS30, 58.45 g of Polystep TD 189, 14.0 g of a 1% aqueous solution of Versene 100, 1.75 g of sodium sulfate and 1.575 g of sodium erythorbate was added to a ten liter steel reactor. Enough phosphoric acid was added to adjust the pH to 3.8, then 2870.0 g of vinyl acetate was added and the reactor was pressurized with ethylene to 750 psi. While stirring at 500 rpm, the vessel was allowed to come to equilibrium. Once the reactor was at equilibrium (and thereafter) the agitation was reduced to 400 rpm, an aqueous solution of 17.5 g of t-butyl hydroperoxide in 210.0 g of deionized water was slowly added along with an aqueous solution of 14.0 g of sodium erythorbate in 210.0 g of deionized water. The total delay time for these two slow-adds was about three hours. After initiation (two degree rise in reactor temperature), the reactor jacket was raised to 45° C. and an aqueous solution of 437.5 g of deionized water, 115.5 g of Hostapur SAS30, 43.75 g of Polystep TD 189, 0.525 g of sodium acetate and 483.0 g of a 48% aqueous solution of acrylamide and N-ethylolacrylamide (low acetaldehyde) in a 1:1 molar ratio was slowly added over four and ½ hours. The redox couple slow-adds were also slowed down such that they finish 30 minutes after this aqueous delay. The temperature in the reactor was maintained at 60-63° C. while the jacket temperature was maintained between 50-52° C. When the redox couple slow adds were finished, the reactor was allowed to cool to 55° C. Upon cooling, the product was transferred to the stripper. An aqueous solution of 3.5 g of t-butyl hydroperoxide in 31.5 g of deionized water was rapidly added to the reactor. Five minutes later, an aqueous solution of 2.625 g of sodium erythorbate in 31.5 g of deionized water was added over 15 minutes. After stirring overnight, the dispersion was transferred to two clean gallon bottles. The resulting dispersion was 50.48% solid with a pH of 4.7, a Brookfield viscosity of 148 cps, 0.0006% grit and a particle size of 369 nm.

Examples 3, 4 and Comparative Examples A, B

Following the procedures of Examples 1 and 2, interpolymers were synthesized using 48% dispersion of 1:1 mixtures of NMA and Acrylonitrile instead of N-ethylolAcrylamide/Acrylamide mixtures. Thus, Composition A was substantially the same as the Example 1 composition and Composition B was substantially the same as the Example 2 composition except for the self-crosslinking chemicals employed.

Compositions of Examples 1, 2 and Compositions A, B were tested for dry and wet tensile by applying a 20% by weight add-on of the interpolymers to Whatman #4 CHR chromatography paper via a saturation process. The percent add-on is calculated as follows:

$$\text{Add-on \%} = \frac{\text{Saturated fiber } wt. - \text{Unsaturated fiber } wt.}{\text{Saturated fiber } wt.} \times 100\%$$

The unsaturated fiber weight is the weight of the fibers before any binder composition is applied. The saturated fiber weight is the weight of the web after the binder has been applied, and the web is dried to remove substantially all of the water. Nonwoven fibrous webs will generally have an add-on value of from 2 to 50% by weight, preferably from 15 to 30% by weight in most cases.

After treatment with binder, the paper is then drum dried for 90 seconds at 210 to 215° F. and cured for 2 minutes at 300 to 325° F. 1 inch×5 inch strips of the saturated Whatman paper are cut with the 5 inch length in the cross-machine direction (CMD). Tensile strength is measured on a standard Instron tensile tester, set at 3 inch gauge length and 1 inch per min. crosshead speed. Wet tensile strength is measured after soaking specimens for one minute in a 1.0 percent solution of Aerosol OT wetting agent. 5-7 tensile strips are measured for wet tensile strength and an average value is taken. The characteristic wet strength value provided by a binder is reported in grams per inch. Results appear below in Table 1:

TABLE 1

Tensile Comparison of Examples 1, 2 Compositions and Comparative Example A, B Compositions

| Sample | CMD Dry Tensile | CMD Wet Tensile |
|---|---|---|
| Composition A | 6809 g/in | 4064 g/in |
| Composition of Example 1 | 7188 g/in | 3669 g/in |
| Composition B | 7450 g/in | 4251 g/in |
| Composition of Example 2 | 7274 g/in | 3755 g/in |

It is seen from the above data that the Example 1 and Example 2 Compositions exhibited dry and wet tensile comparable to NMA based compositions. These results are surprising because they are contrary to conventional experience where NMA containing compositions generally exhibit much more tensile, especially wet tensile, than N-alkylolacrylamide compositions with $C_2$ and higher alkylol.

There is thus provided in accordance with the invention an aqueous dispersion comprising a self-crosslinking alkylolacrylamide containing interpolymer, the interpolymer being prepared in an emulsion polymerization medium by way of interpolymerizing in the medium: acrylamide monomer; N—$C_2$ to $C_{10}$ alkylolacrylamide monomer, wherein the molar ratio of acrylamide:N—$C_2$ to $C_{10}$ alkylolacrylamide interpolymerized is at least 0.5; and at least one or more additional ethylenically unsaturated monomers added to the medium in an amount of from about 80 weight % to about 98 weight % based on the dry weight of monomer interpolymerized in the medium. Generally, the molar ratio of acrylamide: N—$C_2$ to $C_{10}$ alkylolacrylamide is from 0.5 to 3 such as where the molar ratio of acrylamide:N—C2 to C10 alkylolacrylamide is from 0.75 to 2. The molar ratio of acrylamide:N—$C_2$ to $C_{10}$ alkylolacrylamide may be from 0.9 to 1.5 or from 1 to 1.25.

The amount of acrylamide and N—$C_2$ to $C_{10}$ alkylolacrylamide interpolymerized in the medium is usually from 2 weight % to 20 weight % based on the dry weight of monomer interpolymerized in the medium and may be from 3 weight % to 10 weight % based on the dry weight of monomer interpolymerized in the medium. In one preferred embodiment, the amount of acrylamide and N—$C_2$ to $C_{10}$ alkylolacrylamide interpolymerized in the medium is from 4 weight % to 8 weight % based on the dry weight of monomer interpolymerized in the medium.

The acrylamide monomer is suitably Acrylamide and the N—$C_2$ to $C_{10}$ alkylolacrylamide is suitably selected from N-ethylolAcrylamide, N-propylolAcrylamide, N-butylolAcrylamide and N-benzylolAcrylamide in typical cases. The one or more additional ethylenically unsaturated monomers are selected from: acrylic acid; acrylonitrile; ethyl acrylate; ethylene; isoprene; methyl methacrylate; methyl styrene; butadiene; propylene; styrene; vinyl esters of versatic acid including VeoVa™ 9, VeoVa™ 10 and VeoVa™ 11 vinyl esters and vinyl acetate.

Veova™ vinyl esters are esters of versatic acid available from Hexion Specialty Chemicals, Columbus, Ohio. The vinyl esters have the following general structure:

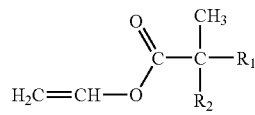

where $R_1$ and $R_2$ are alkyl groups which together may collectively contain from about 6-8 carbon atoms. Especially preferred vinyl esters include VeoVa™ 9, VeoVa™ 10 and VeoVa™ 11 vinyl esters. In VeoVa™ 9, $R_1$ and $R_2$ together contain 6 carbon atoms. In VeoVa™ 10, $R_1$ and $R_2$ together contain 7 carbon atoms. In VeoVa™ 11, $R_1$ and $R_2$ together contain 8 carbon atoms.

In another aspect of the invention, there is provided an aqueous dispersion comprising a self-crosslinking vinyl acetate and N-ethylolAcrylamide containing interpolymer, the interpolymer being prepared in an emulsion polymerization medium by way of interpolymerizing in the medium: Acrylamide monomer; N-ethylolAcrylamide monomer, wherein the molar ratio of Acrylamide:N-ethylolAcrylamide interpolymerized is at least 0.5; and vinyl acetate added to the medium in an amount of from about 50 weight % to about 98 weight % based on the dry weight of monomer interpolymerized in the medium. These specific polymers have generally the attributes noted above. The interpolymer suitably contains from about 5% by weight to about 40% by weight ethylene repeat units and more typically, from about 15% by weight to about 30% by weight ethylene repeat units.

Another aspect of the invention is directed to a nonwoven fibrous substrate comprising fibers bonded with an interpolymer binder, the interpolymer being prepared in an emulsion polymerization medium by way of interpolymerizing in the medium: acrylamide monomer; N—$C_2$ to $C_{10}$ alkylolacrylamide monomer, wherein the molar ratio of acrylamide:N—$C_2$ to $C_{10}$ alkylolacrylamide interpolymerized is at least 0.5; and at least one or more additional ethylenically unsaturated monomers added to the medium in an amount of from about 80 weight % to about 98 weight % based on the dry weight of monomer interpolymerized in the medium. The fibers comprise pulp-derived naturally occurring cellulosic papermaking fibers and/or the fibers comprise polyester fibers, polyethylene fibers, polypropylene fibers, nylon fibers or mixtures thereof.

The add-on of interpolymer (dry weight thereof) to the fibrous substrate is from 2% by weight to about 50% and more typically the add-on of interpolymer to the substrate is from 15% by weight to about 30%.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary.

What is claimed is:

1. An aqueous dispersion comprising a self-crosslinking alkylolacrylamide containing interpolymer, the interpolymer being prepared in an emulsion polymerization medium by way of interpolymerizing in the medium:
    (a) acrylamide monomer;
    (b) N—$C_2$ to $C_{10}$ alkylolacrylamide monomer, wherein the molar ratio of acrylamide:N—$C_2$ to $C_{10}$ alkylolacrylamide interpolymerized is at least 0.5; and
    (c) at least one or more additional ethylenically unsaturated monomers added to the medium in an amount of from about 80 weight % to about 98 weight % based on the dry weight of monomer interpolymerized in the medium, wherein said one or more additional ethylenically unsaturated monomers are selected from vinyl acetate, and a combination of ethylene and vinyl acetate.

2. The aqueous dispersion according to claim 1, wherein the molar ratio of acrylamide:N—$C_2$ to $C_{10}$ alkylolacrylamide is from 0.5 to 3.

3. The aqueous dispersion according to claim 1, wherein the molar ratio of acrylamide: N—$C_2$ to $C_{10}$ alkylolacrylamide is from 0.75 to 2.

4. The aqueous dispersion according to claim 1, wherein the molar ratio of acrylamide:N—$C_2$ to $C_{10}$ alkylolacrylamide is from 0.9 to 1.5.

5. The aqueous dispersion according to claim 1, wherein the molar ratio of acrylamide:N—$C_2$ to $C_{10}$ alkylolacrylamide is from 1 to 1.25.

6. The aqueous dispersion according to claim 1, wherein the amount of acrylamide and N—$C_2$ to $C_{10}$ alkylolacrylamide interpolymerized in the medium is from 2 weight % to 20 weight % based on the dry weight of monomer interpolymerized in the medium.

7. The aqueous dispersion according to claim 1, wherein the amount of acrylamide and N—$C_2$ to $C_{10}$ alkylolacrylamide interpolymerized in the medium is from 3 weight % to 10 weight % based on the dry weight of monomer interpolymerized in the medium.

8. The aqueous dispersion according to claim 1, wherein the amount of acrylamide and N—$C_2$ to $C_{10}$ alkylolacrylamide interpolymerized in the medium is from 4 weight % to 8 weight % based on the dry weight of monomer interpolymerized in the medium.

9. The aqueous dispersion according to claim 1, wherein the acrylamide monomer is Acrylamide and the N—$C_2$ to $C_{10}$ alkylolacrylamide is selected from N-ethylolAcrylamide, N-propylolAcrylamide, N-butylolAcrylamide and N-benzylolAcrylamide.

10. An aqueous dispersion comprising a self-crosslinking vinyl acetate and N-ethylolAcrylamide containing interpolymer, the interpolymer being prepared in an emulsion polymerization medium by way of interpolymerizing in the medium:
    (a) Acrylamide monomer;
    (b) N-ethylolAcrylamide monomer, wherein the molar ratio of Acrylamide:N-ethylolAcrylamide interpolymerized is at least 0.5; and
    (c) vinyl acetate added to the medium in an amount of from about 50 weight % to about 98 weight % based on the dry weight of monomer interpolymerized in the medium.

11. The aqueous dispersion according to claim 10, wherein the molar ratio of Acrylamide:N-ethylolAcrylamide is from 0.5 to 3.

12. The aqueous dispersion according to claim 10, wherein the molar ratio of Acrylamide:N-ethylolAcrylamide is from 0.75 to 2.

13. The aqueous dispersion according to claim 10, wherein the molar ratio of Acrylamide:N-ethylolAcrylamide is from 0.9 to 1.5.

14. The aqueous dispersion according to claim 10, wherein the molar ratio of Acrylamide:N-ethylolAcrylamide is from 1 to 1.25.

15. The aqueous dispersion according to claim 10, wherein the amount of Acrylamide and N-ethylolAcrylamide interpolymerized in the medium is from 2 weight % to 20 weight % based on the dry weight of monomer interpolymerized in the medium.

16. The aqueous dispersion according to claim 10, wherein the amount of Acrylamide and N-ethylolAcrylamide interpolymerized in the medium is from 3 weight % to 10 Weight % based on the dry weight of monomer interpolymerized in the medium.

17. The aqueous dispersion according to claim 10, wherein the amount of Acrylamide and N-ethylolAcrylamide interpolymerized in the medium is from 4 weight % to 8 weight % based on the dry weight of monomer interpolymerized in the medium.

18. The aqueous binder according to claim 10, wherein the interpolymer contains from about 5% by weight to about 40% by weight ethylene repeat units.

19. The aqueous binder according to claim 10, wherein the interpolymer contains from about 15% by weight to about 30% by weight ethylene repeat units.

* * * * *